(12) United States Patent
Bertolini

(10) Patent No.: US 10,415,935 B2
(45) Date of Patent: Sep. 17, 2019

(54) BLAST-RESISTANT BULLETPROOF WINDOW AND ASSOCIATED APPARATUS

(71) Applicant: ISOCLIMA S.P.A., Este (IT)

(72) Inventor: Alberto Bertolini, Este (IT)

(73) Assignee: ISOCLIMA S.P.A., Este (IT)

( * ) Notice: Subject to any disclaimer, the term of this patent is extended or adjusted under 35 U.S.C. 154(b) by 0 days.

(21) Appl. No.: 15/309,810

(22) PCT Filed: Aug. 6, 2015

(86) PCT No.: PCT/EP2015/001631
§ 371 (c)(1),
(2) Date: Nov. 9, 2016

(87) PCT Pub. No.: WO2016/026555
PCT Pub. Date: Feb. 25, 2016

(65) Prior Publication Data
US 2017/0146321 A1    May 25, 2017

(30) Foreign Application Priority Data
Aug. 20, 2014   (EP) ................................. 14425109

(51) Int. Cl.
*F41H 5/26* (2006.01)
*F41H 5/04* (2006.01)
(Continued)

(52) U.S. Cl.
CPC ....... *F41H 5/263* (2013.01); *B32B 17/10366* (2013.01); *B60J 1/02* (2013.01);
(Continued)

(58) Field of Classification Search
CPC . F41H 5/263; F41H 5/0407; B60J 1/02; B60J 1/08; B32B 17/10366; B32B 2571/02; E06B 3/5454; E06B 9/00
(Continued)

(56) References Cited

U.S. PATENT DOCUMENTS 6,212,840 B1 *  4/2001  Davidovitz ............... E04H 9/10
                                                160/327
6,276,100 B1 *  8/2001  Woll ................. B32B 17/10036
                                                216/34
(Continued)

FOREIGN PATENT DOCUMENTS

DE    4314092 A1     1/1994
DE    4335336 A1 *   4/1995   ....... B32B 17/10302
(Continued)

OTHER PUBLICATIONS

Machine translation of Foreign reference DE 19918526, obtained from http://translationportal.epo.org/emtp/translate/?ACTION=description-retrieval&COUNTRY=DE&ENGINE=google&FORMAT=docdb&KIND=A1&LOCALE=en_EP&NUMBER=19918526&OPS=ops.epo.org/3.2&SRCLANG=de&TRGLANG=en (last accessed on Aug. 3, 2017).*

(Continued)

Primary Examiner — Theodore V Adamos
(74) Attorney, Agent, or Firm — Hauptman Ham, LLP

(57) ABSTRACT

The present invention refers to a blast-resistant bulletproof window and a corresponding apparatus, in particular for use in a motor vehicle, which comprises a ballistic block having a peripheral edge and a plurality of panes of glass, ceramic or plastic material bonded to each other over their surfaces in a layered composite, and interposed bonding interlayers plastic material or adhesive, wherein at least one edge groove with particularly rectangular cross section is provided on and along at least a part of the peripheral edge, and an edge recess is provided on an inside surface of the ballistic block or window on and along at least a part of the peripheral edge of the window.

10 Claims, 1 Drawing Sheet

(51) Int. Cl.
  *B32B 17/10* (2006.01)
  *B60J 1/02* (2006.01)
  *B60J 1/08* (2006.01)
  *E06B 3/54* (2006.01)
  *E06B 9/00* (2006.01)

(52) U.S. Cl.
  CPC .............. *B60J 1/08* (2013.01); *E06B 3/5454* (2013.01); *E06B 9/00* (2013.01); *F41H 5/0407* (2013.01); *B32B 2571/02* (2013.01)

(58) Field of Classification Search
  USPC ......................................................... 52/202
  See application file for complete search history.

(56) References Cited

U.S. PATENT DOCUMENTS

| | | | | |
|---|---|---|---|---|
| 6,280,826 B1* | 8/2001 | Woll | ................. | B32B 17/10045 109/49.5 |
| 6,569,787 B1* | 5/2003 | Snelling | ............ | B32B 17/10293 2/2.5 |
| 6,708,595 B1* | 3/2004 | Chaussade | ........ | B32B 17/10064 428/911 |
| 2006/0164719 A1* | 7/2006 | Georgson | .......... | B32B 17/10036 359/359 |
| 2012/0175908 A1* | 7/2012 | McCarthy | ......... | B32B 17/10036 296/84.1 |
| 2014/0060306 A1* | 3/2014 | Bertolini | ............... | F41H 5/0407 89/36.02 |
| 2015/0000511 A1* | 1/2015 | Engl | ................. | B32B 17/10045 89/36.08 |

FOREIGN PATENT DOCUMENTS

| | | | | |
|---|---|---|---|---|
| DE | 4335336 | A1 | | 4/1995 |
| DE | 19918526 | A1 | | 10/2000 |
| DE | 202004007765 | U1 | | 9/2005 |
| EP | 0890467 | A1 * | 1/1999 | ....... B32B 17/10293 |
| EP | 0890467 | A1 | | 1/1999 |
| FR | 2795365 | A1 | | 12/2000 |
| WO | 0153769 | A1 | | 7/2001 |
| WO | WO 2012095098 | A1 * | 7/2012 | ....... B32B 17/10045 |

OTHER PUBLICATIONS

Machine translation of foreign reference DE 4335336, obtained from https://worldwide.espacenet.com/publicationDetails/description?CC=DE&NR=4335336A1&KC=A1&FT=D&ND=3&date=19950420&DB=&locale=en_EP# (last accessed on Dec. 4, 2018) (Year: 2018).*

Machine translation of foreign reference EP 0890467, obtained from http://translationportal.epo.org/emtp/translate/?ACTION=description-retrieval&COUNTRY=EP&ENGINE=google&FORMAT=docdb&KIND=A1&LOCALE=en_EP&NUMBER=0890467&OPS=ops.epo.org/3.2&SRCLANG=de&TRGLANG=en (last accessed on Dec. 4, 2018) (Year: 2018).*

International Search Report and Written Opinion dated Nov. 3, 2015 in International Application No. PCT/EP2015/001631.

* cited by examiner

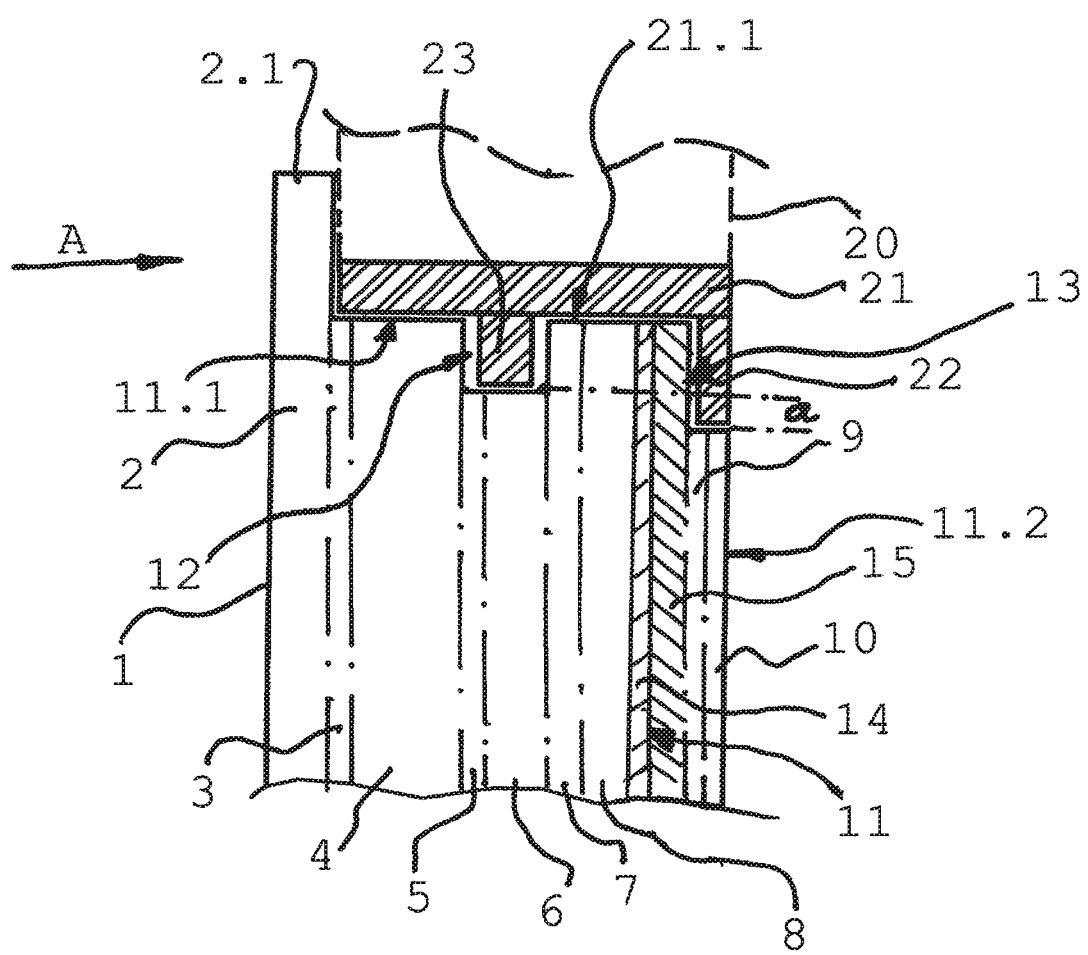

BLAST-RESISTANT BULLETPROOF WINDOW AND ASSOCIATED APPARATUS

RELATED APPLICATIONS

The present application is a National Phase of International Application Number PCT/EP2015/001631, filed Aug. 6, 2015, and claims priority to European Application Number 14425109.7, filed Aug. 20, 2014.

The present invention relates to a bulletproof window and to an associated bulletproof apparatus according to the preambles of claim 1 and claim 7, respectively, in particular for use in a motor vehicle or car.

EP 0890467 E1 describes a door frame of a protected vehicle in which a laminated bulletproof glass pane or window is arranged that has five layers of bulletproof glass. The outside glass layer has a protrusion for fixing the whole glass pane in the door frame. The door frame comprises a frame strengthening profiled element with a web engaging in a groove on the peripheral face of the bulletproof glass pane. In the case of a strong blast or explosion, the protrusion of the outside layer can break and the bulletproof glass pane could fall into the interior of the vehicle due to forced deformation and shifting of the profiled element in a peripheral direction away from the bullet proof glass pane which could become dangerous for the passengers in the vehicle.

It is thus an object of the present invention to provide a blast-resistant bulletproof window and an associated bullet- and blast-resistant apparatus which protects the interior of a vehicle against the effects of a blast or explosion from outside of the vehicle.

This object is solved by the blast-resistant bulletproof window mentioned in claim 1. Accordingly, the blast-resistant bulletproof window or glazing of the present invention, which is preferably used in a motor vehicle, e.g. as a windscreen or side lite in a car, a ship or an aircraft, comprises a ballistic block that has a peripheral edge or edge surface and a plurality of panes of glass, ceramic or plastic material bonded to each other over their surfaces in a layered composite, and interposed bonding interlayers of plastic material or adhesive, wherein at least one or more edge groove (s) with particularly rectangular cross section on and along at least a part of the peripheral edge and an edge recess on an inside surface of the ballistic block or window on and along at least a part of the peripheral edge of the window are provided.

The groove and the recess are provided for engagement with protruding parts of the vehicle body and they, therefore, avoid in cooperation not only that the blast-resistant bulletproof window can fall into the interior of the vehicle, but also that the window can fall out from the vehicle to its outside, the reverse direction, due to a negative pressure on outside of the vehicle as result of the blast wave. Particularly, since a protruding part or strip engages the recess on inside of the window, deformation and shifting of the armoring device of the invention are avoided or substantially reduced in case of a blast. Accordingly, the window of the invention ensures protection of the passengers inside of the vehicle.

In a preferred embodiment of the invention, the bullet- and blast-resistant window shows an additional outer transparent pane or layer made of bulletproof glass, ceramic or plastic material, e.g. polycarbonate, which is bonded to or glued on an outside surface of the ballistic block by an interposing layer made of plastic material. The additional outer glass pane may protrude the peripheral face of the ballistic block on the peripheral edge of the bullet- and blast-resistant window of the invention to form a protrusion of the outer glass pane which is used to fix the window on the body of the vehicle, for instance, in a door frame or rabbet of the vehicle chassis.

At least one or more edge groove (s) and the edge recess are provided in parallel to each other on the peripheral edge to enhance the protection against blast and bullets.

The edge recess may be provided in the extension of a pane made of PC (polycarbonate) and/or in the extension of a pane of glass and/or in the extension of an interlayer and/or in the extension of a pane made of vitreous ceramic. At least one edge groove may be provided in the extension of a pane made of PC (polycarbonate) and/or in the extension of a pane of glass and/or in the extension of an interlayer and/or in the extension of a pane made of vitreous ceramic to make the production less complex.

According to claim 7 of the invention, a blast-resistant bulletproof apparatus to be used in particular in an automotive vehicle, comprises a blast-resistant bulletproof window as mentioned above and a bullet-resistant armoring device provided to be engaged in at least one or more edge groove(s) of the window and in an edge recess of window, and provided on a vehicle body or door frame.

The bullet-resistant armoring device may comprise at least one or more corresponding part(s) (for engaging in the at least one or more edge groove((s) and a corresponding part for engaging in the edge recess to ensure the blast resistance together with the bullet resistance of the apparatus of the invention.

The bullet-resistant part or strip may cover the edge recess completely and/or it overlaps the at least one bullet-resistant edge groove or the at least one bullet-resistant additional part arranged in the edge groove of the ballistic block laterally to ensure bulletproof characteristics.

Preferably, a part or strip arranged in the recess covers and/or overlaps the edge groove laterally to ensure protection against bullets. A lateral overlapping distance of the bullet resistant part or steel should be always positive to ensure protection.

The bullet- and blast-resistant window of the present invention can be formed as a composite security glass pane, e.g. as a windshield, fixed to the vehicle, or as a moveable, retractable or extendable side window of a vehicle.

The blast-resistant bulletproof window of the invention may comprise a protective anti-splinter plastic pane, particularly a PC pane, arranged between the edge groove and the edge recess and adjoining the edge recess.

The bullet-resistant device with vertical parts may be a complete or partial frame, such as a framing strip on three sides of a window or an edge reinforcement of steel, which will only be provided on a portion of the circumference of the blast- and bullet-proof window.

The vertical parts of the vehicle body may be assembled of individual parts, arranged in series on the circumference of the blast resistant device in order to form the complete vertical parts.

The armoring device is not a part or portion of the bullet- and blast-resistant window or glazing, but it is a part or portion of the body or chassis of the vehicle. For instance, the armoring device can be a part or portion of a door or door frame of the vehicle or of a window rabbet of the body of the vehicle. The armoring device may also be a separate part that fixed on the body of the vehicle by, for instance, screws or welding.

The bullet- and blast-resistant apparatus provides an effective resistance against deformation or shifting of the vehicle frame or the breaking of the window glass itself at its peripheral edge, resulting in an improved protection of the interior of the vehicle, due to the engaging cooperation of the armored device of the vehicle body and the groove and recess of the window wherein the armoring device engages the circumferential groove and recess if the window is installed on the vehicle.

Preferably, the bullet resistant armoring device can fit positively into the groove and recess of the window or ballistic block to keep the window in the door frame during blast and to distribute the pressure during blast on a large surface in an even manner. Further, the bullet-resistant armoring device can be formed to fit positively into the groove and recess of the ballistic block to ensure the intended bullet-proof characteristics of the window together with a compact and space saving structure.

The armoring device may be arranged laterally flush on the peripheral edge of the ballistic block, thereby providing a space-saving and compact structure of the blast- and bullet-resistant apparatus of the invention when the armoring device engages the edge groove and the edge recess of the window.

Further advantageous elaborations of the present invention can be seen from the dependent claims. Further advantages, advantageous elaborations and usages of the invention can be seen from the following description of exemplary and preferred embodiments of the invention with reference to the accompanying drawings, wherein:

FIG. 1 is a schematic and partial cross-sectional view of only a peripheral edge of a blast-resistant bulletproof window according to a preferred embodiment of the invention with an associated apparatus of the invention.

FIG. 1 shows a partial view in cross-section of a blast-resistant bulletproof apparatus according to a preferred embodiment of the invention which comprises a blast-resistant bulletproof transparent window 1 or glazing according to a preferred embodiment of the invention as a composite security glazing together with a blast-resistant bulletproof armoring device 21 that is a portion of a vehicle body 20 or door frame of, for instance, an automotive vehicle. The following is a detailed explanation of the embodiment of the invention shown in FIG. 1 with exemplary reference to the usage of the bulletproof window 1 according to the present invention as a side lite or windscreen of the automotive vehicle.

The transparent blast-resistant bulletproof window 1 of FIG. 1 shows a transparent ballistic block 11 and at least one outer transparent glass pane 2 arranged on an outside of the vehicle, i.e. on the side of impact of, for instance, a bullet or the pressure wave of an explosion or bomb blast. The outside and thus the impact side of the vehicle, is indicated by arrow A in FIG. 1, which faces toward an outer glass pane 2.

The ballistic block 11 comprises a laminate or composite that has three sandwiched or laminated glass panes 4, 6, and 8, a polycarbonate (PC) pane 10 that is arranged on the inside of the vehicle, and bonding interlayers 5, 7, and 9 of plastic material, e.g. of polyurethane (PU) or polyvinyl butyral (PVB) foil, which provide a composite or laminate between the glass pane 4 and the PC pane 10. Between the bonding interlayer 9 and the glass pane 8, a further PC pane 15 is arranged which is bonded to the glass pane 8 by means of a further bonding interlayer 14 of plastic material, e.g. of PU foil, and which is bonded to the inside PC pane 10 by means of the bonding interlayer 9. The further PC pane 15 is used to avoid that glass splinters resulting from shooting on the edge region of the ballistic block 11 or from damage of the ballistic block 11 can enter the interior of the vehicle. The PC pane 15 covers the whole flat pane side surface of the glass pane 8 and it adjoins the edge recess 13. As shown in FIG. 1, an edge region of the PC pane 15 is arranged between the first and second protruding parts 22 and 23 of the device 21 of the vehicle body 20 when the window 1 is in engagement with the device 21 of the vehicle body 20.

The outer glass pane 2 has a portion that is a protrusion 2.1 at the peripheral edge 11.1 which protrudes the ballistic block 11 and it is connected to the glass pane 4 of the ballistic block 11 by means of a further interlayer 3 made of, for instance, PVB.

The peripheral edge 11.1 of the ballistic block 11 provides a circumferential continuous edge groove 12 with rectangular cross section or u-form which is arranged approximately in the middle of the window 1 between the glass panes 4 and 8 and in extension of the glass pane 6. The ballistic block 11 has a circumferential continuous edge recess 13 or step which is provided on an inside surface 11.2 of the ballistic block 11 on its peripheral edge 11.1. The edge recess 13 faces to inside of the vehicle. The edge groove 12 and the edge recess 13 are provided along the whole or a part of peripheral circumference or edge of window 1. The edge groove 12 and the edge recess 13 are provided in parallel to each other on the peripheral edge 11.1.

The blast-resistant bulletproof device 21 of the vehicle body 20 covers the complete peripheral edge 11.1 of the ballistic block 11 like an at least partly circumferential frame if at engages completely the edge groove 12 and the edge recess 13 which means that the window 1 is in a closed position. More detailed the device 21 comprises as shown in FIG. 1 a plane lower side 21.1 wherein a circumferentially extending continuous first part 23 of the vehicle body 20 protrudes normally from the lower side 21.1 of the device 21 towards the peripheral edge 11.1 of the ballistic block 11 and engages the edge groove 12. Further, a circumferentially extending continuous second part 22 of the vehicle body 20 also protrudes normally from the lower side 21.1 of the device 21 towards the peripheral edge 11.1 of the ballistic block 11 and engages the edge recess 13 that is provided on the inside surface 11.2 of the ballistic block 11 which corresponds to the inside surface of the polycarbonate pane 10. In engaging position, as shown in FIG. 1, the device 21 and the second part 22 are flush to the inside surface 11.2 of the ballistic block 11. The second part 22 overlaps the first part 23 by a positive length a laterally. The first and second parts 22, 23 are strips with rectangular cross section. The bulletproof device 21 of the vehicle body 20 may be made of ballistic steel.

In case of a blast on the outside of window 1, if the window 1 is in closed engaging position as shown in FIG. 1, the protrusion 2.1 of the outer glass pane 2 of the blast-resistant bulletproof window 1 can break if the blast is too strong. Then the second part 22 avoids the window 1 to fall inside the vehicle. In the case of a following negative blast pressure on outside the vehicle, then the first part 23 avoids the window 1 to fall outside the vehicle. Accordingly, the parts 22, 23 of the vehicle body 20 engaging the edge groove 12 and the edge recess 13 maintain the window 1 in the vehicle even in case a strong blast would break the protrusion 2.1, and, therefore, protection of the passengers in the car is maintained.

The invention claimed is:

1. A blast-resistant bulletproof apparatus for an automotive vehicle, the blast-resistant bulletproof apparatus comprising:
a blast-resistant bulletproof window; and
a bullet-resistant armoring device,
wherein the blast-resistant bulletproof window comprises a ballistic block having a peripheral edge and comprising:
  a plurality of panes of glass, ceramic or plastic material;
  interposed bonding interlayers of plastic material or adhesive, wherein the plurality of panes are bonded to each other in a layered composite by the interposed bonding interlayers;
  at least one U-shaped edge groove having a U-shaped cross section in a cross sectional view taken along a thickness direction in which the plurality of panes are bonded to each other in the layered composite of the ballistic block, and the at least one U-shaped edge groove being provided on and along at least a part of the peripheral edge of the ballistic block; and
  an edge recess provided on an inside surface of the ballistic block on and along at least a part of the peripheral edge of the ballistic block,
the plurality of panes of the ballistic block includes:
  a protective anti-splinter plastic pane made of PC (polycarbonate);
  a glass pane arranged between the protective anti-splinter plastic pane made of PC and the U-shaped edge groove of the ballistic block; and
  an inside pane made of PC, the inside pane being an innermost pane of the ballistic block,
the protective anti-splinter plastic pane made of PC is arranged between the U-shaped edge groove and the edge recess, adjoins the edge recess, and has a protruding part projecting beyond an end face of the inside pane,
the edge recess is defined by the protruding part of the protective anti-splinter plastic pane made of PC and the end face of the inside pane such that the edge recess is provided in an extension of the inside pane and in an extension of an interlayer among the interposed bonding interlayers of the ballistic block,
the bullet-resistant armoring device is configured to be provided on a vehicle body or door frame of the automotive vehicle, and is not a part of the blast-resistant bulletproof window,
the bullet-resistant armoring device comprises
  at least one first bullet-resistant part which is engaged in the at least one U-shaped edge groove when the blast-resistant bulletproof window is in a closed position, and
  a second bullet-resistant part which is engaged in the edge recess of the ballistic block when the blast-resistant bulletproof window is in the closed position,
the inside surface of the ballistic block is defined by an inside surface of the inside pane, and is flush to an inside surface of the second bullet-resistant part when the second bullet-resistant part is engaged in the edge recess,
the inside surface of the ballistic block and the inside surface of the second bullet-resistant part are surfaces configured to face toward an inside of the automotive vehicle, and
the protective anti-splinter plastic pane made of PC covers an entirety of a flat pane inside surface of the glass pane of the ballistic block.

2. The blast-resistant bulletproof apparatus according to claim 1, further comprising:
  an outer pane that is in addition to the plurality of panes of the ballistic block, is made of glass, ceramic or plastic material, and is bonded to an outside surface of the ballistic block by an interposing layer made of plastic material, the outer pane projecting over the peripheral edge of the ballistic block.

3. The blast-resistant bulletproof apparatus according to claim 1, wherein
  the at least one U-shaped edge groove and the edge recess are provided in parallel to each other on the peripheral edge.

4. The blast-resistant bulletproof apparatus according to claim 1, wherein
  the bullet-resistant armoring device covers completely the peripheral edge or an edge surface of the ballistic block when the blast-resistant bulletproof window is in the closed position.

5. The blast-resistant bulletproof apparatus according to claim 1, wherein, when the blast-resistant bulletproof window is in the closed position,
  the at least one first bullet-resistant part of the bullet-resistant armoring device fits positively into the at least one U-shaped edge groove, and
  the second bullet-resistant part of the bullet-resistant armoring device fits positively into the edge recess.

6. The blast-resistant bulletproof apparatus according to claim 1, wherein
  the second bullet-resistant part covers the edge recess completely when the blast-resistant bulletproof window is in the closed position.

7. The blast-resistant bulletproof apparatus according to claim 1, wherein
  the at least one first bullet-resistant part, which fits positively into the at least one U-shaped edge groove when the blast-resistant bulletproof window is in the closed position, and the second bullet-resistant part, which fits positively into the edge recess of the ballistic block when the blast-resistant bulletproof window is in the closed position, are bullet-resistant strips made of ballistic steel.

8. The blast-resistant bulletproof apparatus according to claim 7, wherein
  in the thickness direction in which the plurality of panes are bonded to each other in the layered composite of the ballistic block, the second bullet-resistant part made of ballistic steel and positively fit into the edge recess overlaps the at least one U-shaped edge groove when the blast-resistant bulletproof window is in the closed position.

9. The blast-resistant bulletproof apparatus according to claim 7, wherein
  in the thickness direction in which the plurality of panes are bonded to each other in the layered composite of the ballistic block, the second bullet-resistant part made of the ballistic steel and positively fit into the edge recess overlaps the at least one first bullet-resistant part made of the ballistic steel and positively fit into the at least one U-shaped edge groove when the blast-resistant bulletproof window is in the closed position.

10. The blast-resistant bulletproof apparatus according to claim 1, wherein
  the bullet-resistant armoring device covers partly the peripheral edge or an edge surface of the ballistic block when the blast-resistant bulletproof window is in the closed position.

* * * * *